No. 772,360. PATENTED OCT. 18, 1904.
C. JENSEN.
STORAGE AND ASSORTING NET FOR FISH.
APPLICATION FILED JULY 2, 1904.
NO MODEL.
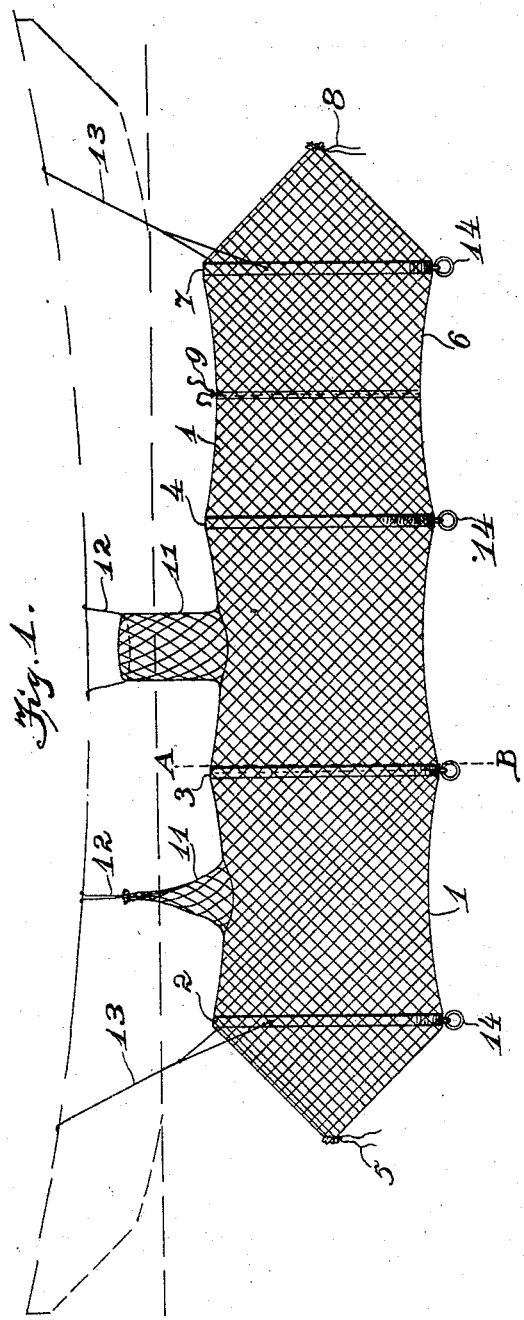
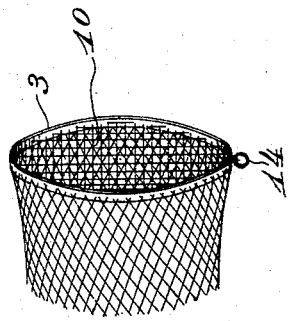
WITNESSES:
Wellington M. Blewitt
Pearl Martin
INVENTOR
Cornelius Jensen
BY James T. Watson
His ATTORNEY.

No. 772,360. Patented October 18, 1904.

UNITED STATES PATENT OFFICE.

CORNELIUS JENSEN, OF SUPERIOR, WISCONSIN.

STORAGE AND ASSORTING NET FOR FISH.

SPECIFICATION forming part of Letters Patent No. 772,360, dated October 18, 1904.

Application filed July 2, 1904. Serial No. 215,190. (No model.)

*To all whom it may concern:*

Be it known that I, CORNELIUS JENSEN, a citizen of the United States, residing at Superior, in the county of Douglas and State of Wisconsin, have invented certain new and useful Improvements in Storage and Assorting Nets for Fish; and I do hereby declare the following to be a full, clear, and exact description of the invention, such as will enable others skilled in the art to which it appertains to make and use the same.

My invention relates to assorting and storage nets for fish, and has for its object the provision of a submergible compartment-net accessible for depositing fish while submerged.

With this and other objects in view it consists of the constructions, combinations, and arrangements of parts hereinafter described and claimed.

In the drawings, Figure 1 is a side elevation of said invention. Fig. 2 is a perspective view of a portion of said net to the left of the line A B of Fig. 1.

In the drawings, 1 is an approximately cylindrical net stretched over hoops 2, 3, and 4 and secured thereto in any suitable manner. One end of said net, as shown, is gathered by a drawing-string 5 to close said end, and, as shown, the opposite end is laced to one end of an extension-net 6, stretched upon and secured to a hoop 7, said extension being gathered at its free end by a draw-string 8. It is obvious, however, that said extension may be omitted within the scope of my invention and that the corresponding end of the net 1 might be gathered by the cord 9 otherwise used for such lacing.

Extending across said hoop 3 is a perforate or netted diaphragm 10, dividing said net 1 into two compartments. Communicating with the respective compartments in said net are the corresponding necks 11, which may be attached to said net 1 or which may, as shown, be woven into the same. Said necks are adapted to be closed at their free ends by any suitable means, as drawing-strings 12, and are in operation drawn above the water and supported, preferably, from the gunwale of the fishing-boat. (Shown in dotted lines.)

The main body of the net is submerged and preferably supported from the boat by cords 13.

In operation each fisherman may put his own catch into the compartment assigned to him, introducing the fish thereto through the corresponding neck, or one or more fishermen may put fish of one kind or size into one compartment and fish of another kind or size into another compartment of said net. In each event the fish will keep alive and fresh, and in the one event the fish remain divided as to ownership or assorted as to kind or size. The net may then be anchored, if desired, by attaching any suitable anchoring means to rings 14, secured to said hoops. The net may be extended by lacing onto the ends other extension-nets, which may, if desired, be divided into compartments. After fishing the nets may, if desired, be unlaced from each other and the ends of each gathered by its own draw-string. To remove the fish, they are preferably driven toward the gathered end of their compartment, and the net behind them is gathered in the hands, and the free end is lifted over a proper receptacle. The draw-string in the extreme end is then loosened, and part or all of the fish are dumped out into said receptacle, and the net is again closed and cast overboard.

Having now described my invention, what I claim, and desire to secure by Letters Patent, is—

A fish-net provided with spreading-hoops and divided into compartments, each compartment having an opening in one of its ends for removing fish and each compartment having an outwardly-extending neck provided at its free end with an opening for the introduction of fish into said net, means for closing said necks and means for closing the open ends of said net, substantially as described.

In testimony whereof I hereunto affix my signature in presence of two witnesses.

CORNELIUS ×his mark JENSEN.

Witnesses:
JAMES T. WATSON,
A. JOHNSON.